United States Patent
Rentschler et al.

(10) Patent No.: US 11,301,942 B2
(45) Date of Patent: Apr. 12, 2022

(54) METHOD FOR TRADING ELECTRICAL ENERGY BETWEEN SMALL PRODUCERS AND END USERS

(71) Applicant: SIEMENS AKTIENGESELLSCHAFT, Munich (DE)

(72) Inventors: Alexander Rentschler, Bensheim (DE); Walter Filipp Rosinski, Weisendorf (DE); Christian Pfeifer, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 19 days.

(21) Appl. No.: 16/628,833

(22) PCT Filed: Jul. 5, 2017

(86) PCT No.: PCT/EP2017/066815
§ 371 (c)(1),
(2) Date: Jan. 6, 2020

(87) PCT Pub. No.: WO2019/007504
PCT Pub. Date: Jan. 10, 2019

(65) Prior Publication Data
US 2020/0134743 A1 Apr. 30, 2020

(51) Int. Cl.
*G06Q 50/06* (2012.01)
*G06Q 20/38* (2012.01)
(Continued)

(52) U.S. Cl.
CPC ........... *G06Q 50/06* (2013.01); *G01R 21/001* (2013.01); *G06Q 20/389* (2013.01); *G06Q 40/04* (2013.01); *H02J 3/008* (2013.01)

(58) Field of Classification Search
CPC ...... G06Q 50/06; G06Q 20/389; G06Q 40/04; G06Q 30/06; H02J 3/008; G01R 21/001; Y02B 10/30
See application file for complete search history.

(56) References Cited

U.S. PATENT DOCUMENTS

| 8,990,114 B2 * | 3/2015 | Terano | H02J 3/008 |
| | | | 705/37 |
| 9,563,215 B2 * | 2/2017 | Forbes, Jr. | G05F 1/66 |

(Continued)

FOREIGN PATENT DOCUMENTS

| DE | 102015114215 A1 | 3/2017 | |
| EP | 3301880 A1 * | 4/2018 | ........... H04L 9/3236 |

(Continued)

OTHER PUBLICATIONS

Dept of Energy: Planning for home renewable enery, 2016, pp. 1-9 (Year: 2016).*

(Continued)

*Primary Examiner* — Bijendra K Shrestha
(74) *Attorney, Agent, or Firm* — Laurence A. Greenberg; Werner H. Stemer; Ralph E. Locher

(57) ABSTRACT

A device for controlling the feeding and discharging of electrical energy in or from a small producer network having at least one energy producer and at least one energy consumer. The device includes a transaction unit for communicating with at least one electronic energy trade prospect in order to negotiate and/or to define a transaction of a predefined quantity of energy; a measuring system for measuring a quantity of fed or discharged energy; a control system, which is in communication with the measuring system, designed to feed or to discharge the predefined quantity of energy via an electrical cable and controlled via a logic unit.

12 Claims, 2 Drawing Sheets

(51) Int. Cl.
    *G06Q 40/04*    (2012.01)
    *G01R 21/00*    (2006.01)
    *H02J 3/00*     (2006.01)

(56) References Cited

U.S. PATENT DOCUMENTS

| | | | |
|---|---|---|---|
| 9,754,393 B2 * | 9/2017 | Kitaji | H02J 3/381 |
| 2011/0055036 A1 | 3/2011 | Helfan | |
| 2011/0080044 A1 * | 4/2011 | Schmiegel | H02J 3/383 |
| | | | 307/23 |
| 2016/0056628 A1 * | 2/2016 | Burstall | H02J 3/32 |
| | | | 700/295 |
| 2016/0211664 A1 * | 7/2016 | Subbotin | H02J 3/00 |
| 2018/0182048 A1 * | 6/2018 | Stocker | G06Q 20/223 |

FOREIGN PATENT DOCUMENTS

| | | | | |
|---|---|---|---|---|
| WO | WO-2016151316 A1 * | 9/2016 | | G06Q 30/06 |
| WO | WO 2016151316 A1 | 9/2016 | | |

OTHER PUBLICATIONS

Dimitriou et al.: Privacy-Friendly Tasking and trading of energy in Smart Grid, 2013, pp. 1-8 (Year: 2013).*

* cited by examiner

METHOD FOR TRADING ELECTRICAL ENERGY BETWEEN SMALL PRODUCERS AND END USERS

BACKGROUND OF THE INVENTION

Field of the Invention

The present invention relates to an apparatus and a method for controlling a supplying and taking of electrical energy to and from a small producer network having at least one energy producer and at least one energy consumer. The present invention further relates to a system for transmitting energy and, in conjunction therewith, a coupled method allowing the transmitted energy to be traded.

Conventionally, private end users of electrical energy can conclude agreements with local energy suppliers on stipulated terms. Regardless of their actual or instantaneous demand for energy, they are therefore tied to fixed supply arrangements, e.g. concerning price per kilowatt hour. Conventionally, the regional distribution system operators (DSOs) can therefore act as local distributors of electrical energy, which for the most part is transmitted by cross-regional transmission system operators (TSOs). At present, it is not possible for private end users to reflect their present or planned demand in the market-based availabilities (regional or cross-regional) of electrical energy and thereby to achieve an optimum consumption/price, for example. To date, the private end user has no direct influence on the present energy suppliers or on the pricing for an energy market for private suppliers and consumers.

Further, it is currently not possible for a private energy producer to trade electrical energy produced by solar cells, for example, directly.

SUMMARY OF THE INVENTION

It is therefore an object of the present invention to improve the transmission of energy and/or the negotiation of conditions for the transmission of energy and hence to provide end users, in particular, with greater flexibility for obtaining or delivering energy.

The object is achieved by the subjects of the independent claims, which are directed to an apparatus for controlling a supplying and taking of electrical energy to and from a small producer network, and to a corresponding method.

Embodiments of the present invention can be used for private energy trade, for which purpose open-loop and closed-loop control systems therefor are proposed. Embodiments can be used for providers of infrastructure for the transport of electrical energy, energy producers, regional distribution system operators (DSOs).

Embodiments of the present invention can allow a private small energy producer (photovoltaics/small-scale geothermal energy/wind power/hydroelectric power/etc.) to supply its currently available energy. Embodiments of the present invention allow energy produced to be supplied and/or sold and/or transmitted without requiring a cross-regional transmission system operator as a participant in the trade.

In accordance with one embodiment of the present invention, an apparatus for controlling a supplying and taking of electrical energy to and from a small producer network having at least one energy producer and at least one energy consumer (from and to an external energy system) is provided. Said apparatus has: a transaction unit for communicating with at least one electronic energy trade prospect (in particular in an energy trading network having a plurality of communicatively connected prospects), in order to negotiate and/or define a transaction for a prescribed amount of energy; a measuring system for measuring an amount of supplied or taken energy; a control system in communication with the measuring system, designed to supply or take the prescribed amount of energy via an electrical cable. In particular, a logic unit may be included in the apparatus, as explained below.

The users linked by means of this invention are referred to as "prospects" in the remainder of this document. Said prospects can participate in the energy trade via a central platform ("server"), and via a decentralized network (for example by means of blockchain).

In an (energy trading) communication network, potential vendors and purchasers of energy may be communicatively connected.

The energy trade prospect may itself have an apparatus for controlling a supplying and taking of electrical energy, with a separate transaction unit, logic unit and measuring and control system.

The apparatus may be implemented in hardware and/or software. The apparatus can allow private trading of power between private end customers. The power produced by the energy producer of the small producer network can typically vary greatly over the day or else vary greatly over the season or the course of the year. The energy producer can comprise e.g. a photovoltaic system, a small-scale geothermal energy system, a wind turbine, a water turbine or a combination of these. Photovoltaic cells may be mounted e.g. on a roof of a residential building. The small producer network can have a grid voltage of between 100 volts and 300 volts, in particular of approximately 220 volts.

To transmit an amount of energy (or power for a given time) from or to the small production network, it may be necessary to provide for a voltage transformation. In order e.g. to take electrical energy from the small producer network, the applicable energy flow, which is at a certain voltage, can be transformed into an energy flow at a higher voltage. In order to supply electrical energy to the small producer network, an energy flow at a higher voltage can be transformed into an energy flow at a lower voltage. A transformation ratio in this case may be e.g. between 1 and 100 or 5 and 50.

The transaction unit and the energy trade prospect may be communicatively connected e.g. via the internet. They may be connected e.g. by wire or wirelessly. Agreements can be concluded with the energy trade prospects without the need for direct interaction by a user, in particular a human user.

The transaction can arrange either to supply the prescribed amount of energy to the small producer network or in particular to take the prescribed amount of energy from the small producer network, in order to feed it to an energy system and in particular to supply it to a customer, for example an end customer. The transaction may be characterized by a plurality of pieces of information that define the amount of energy, define the supply period, define the supply duration, define the supplied amount, define the supply location and/or define the price. Further, the type of production may be defined. The transaction can define an offer of a supply of energy or define a purchase of energy. This can involve a blockchain being used. Blockchains have been used to date primarily in the field of cryptocurrencies.

The measuring system can comprise a series of measurement sensors for measuring voltage, current, power supplied to the small producer network or taken from the small producer network. The control system can comprise one or more high-current components, for example relays and/or power transistors with appropriate driver circuits, in order to adjust the prescribed amount of energy, i.e. the power flow, in suitable fashion.

Flexible trading of electrical energy between small energy suppliers or between a small energy supplier and a conventional end user connected to an electrical energy system is therefore rendered possible.

Said apparatus can further have a logic unit in communication with the control system and the transaction unit, in order to actuate the control system on the basis of the transaction. The logic unit can act as an intermediate layer between the transaction unit and a local measuring and control unit comprising the measuring system and the control system. Communication data streams can flow between the logic unit and the transaction unit in both directions and secondly between the logic unit and the measuring and control unit in both directions. The logic unit can also allow configuration of the apparatus, in order to increase a flexibility of the flow control and/or of the use.

In accordance with one embodiment of the present invention, the logic unit is designed to communicate a control signal for a flow of energy in concordance with the predetermined amount of energy to the control system. For example, certain power preset values or energy preset values can be transmitted to a driver circuit, which can actuate appropriate power transistors, in order to allow an energy flow from the small energy production network or to the small energy production network for a defined time for a defined level.

The logic unit may also be designed to obtain parameters relevant to the control of the control unit from a database. This allows the logic unit to be designed in a simple manner and e.g. configured by parameters from the database.

In accordance with one embodiment of the present invention, the logic unit is designed to produce a forecast about energy (or power) required or available in the small energy production network, in order to define the predetermined amount of energy. For example, the logic unit can obtain information about the weather in the future or can obtain information about a weather forecast and can take the weather forecast as a basis for e.g. estimating the amount of expected energy or power produced that may be available for example via photovoltaic cells and/or by means of utilization of wind power in future. This allows the maximum energy able to be taken from the small energy producer network to be estimated or ascertained. It is also possible for a forecast about the demand for electrical energy within the small energy producer network for specific consumers to be ascertained. By way of example, an electric vehicle may be present as an energy consumer, which is typically charged with electrical energy in specific time intervals or time periods. It may also be known that specific household appliances or household machines are preferably operated in specific time periods. On the basis of the forecast, it may be ascertained that the small energy producer network requires additional energy externally for specific time intervals and has energy in excess in other time intervals, which means that this excess energy can be transmitted to other (external) end users. Accordingly, the logic unit can transmit information about a demand for or an availability of energy to the transaction unit. Furthermore, it is also possible for the logic unit to be used to store its own foreseeable and/or typical energy consumption in order to ensure that for example initially its own demand for electrical energy is covered by its own production and only the excess is offered. Further, it is possible for further defining conditions to be set or configured by the logic unit or in particular a user of the logic unit, these likewise being able to be transmitted to the transaction unit. The transaction unit may then be designed to transmit an applicable offer of energy to the energy trade prospect or to display a demand for energy for the energy trade prospect.

The energy trade prospect may have a multiplicity of further users connected to it that can likewise display an offer of energy or a demand for energy for the energy trade prospect. If there is an overlap between the demand of a first user and the offer of energy from a second user, then an appropriate agreement about the transmission of electrical energy under specific conditions can be concluded electronically.

The apparatus can further have a blockchain, which initially shows the information pertaining to a supply of energy or a demand for energy in a block. If there is an applicable supplier or customer in this regard in the trading system, then, with reference to the block above, the agreement is concluded in a further block and documented in the blockchain. This also involves the advantages of cryptography that have normally been associated therewith to date being used.

A blockchain can be understood to mean a database whose integrity (protection against subsequent manipulation) is ensured by storage of the hash value of the preceding data record in the respectively subsequent data record, that is to say by cryptographic concatenation. Blockchain can be a technical basis for what is known as cryptocurrency. A blockchain can allow a unity between the nodes to be attained in a decentralized network.

In particular, a multiplicity of parties involved in a network can redundantly hold data about transactions performed in the past, in particular in encrypted form. A distortion of the concatenated data entries about the transactions in a memory of one of the parties involved can be detected, and hence reversed again, by means of comparison with the data records of the other parties involved on the basis of an absence of concordance. It is therefore possible for a safe method for trading and for transmitting electrical energy to be ensured. Within this application, there is the added advantage that the hash for the agreement also safely documents the amount of energy to be supplied. At the end of the transaction, it is thus possible to use a safe basis to compare whether the supplied amount of energy is also consistent with the agreement.

In accordance with one embodiment of the present invention, the measuring unit is designed to communicate the amount of supplied or taken energy to the logic unit. On the basis of this feedback, the logic unit can actuate the control system such that the prescribed or predetermined amount of energy is actually supplied or taken.

In accordance with one embodiment of the present invention, the apparatus may be designed such that, if the amount of energy is to be taken, in order to define a provision or, if the amount of energy is to be taken, or in order to configure a search for and/or a selection of the transaction, if the amount of energy is to be supplied, at least one of the following is communicated from the logic unit to the transaction unit:

report of the expected suppliable amount of energy,
supply period,
supply duration,
supplied amount,
location,
price,
type of production.

Further information can be communicated to configure a search or for another purpose. It is thus possible for a supply of energy or a demand for energy to be characterized in detail, so as to increase the flexibility of the energy trade.

In accordance with one embodiment of the present invention, the apparatus is configured such that the transaction unit transmits information pertaining to the concluded transaction to the logic unit, wherein the information concerning when the amount of energy is to be supplied or to be taken comprises at least one of the following:
  confirmation of conclusion of an agreement,
  supply period,
  supply duration,
  supplied amount,
  location,
  price,
  type of production.

The recording of further required information is additionally possible.

In accordance with one embodiment of the present invention, a network system is provided that comprises: at least one energy user having an electrical connection; an energy producer, connected to the electrical connection of the energy user for the purpose of transmitting electrical energy, and an apparatus in accordance with one of the preceding embodiments, wherein the transaction unit is communicatively connected to the energy user for the purpose of arranging a transaction relating to an amount of energy to be transmitted, wherein the arranged amount of energy is able to be taken via the electrical cable and is suppliable to the energy user via the electrical connection.

The network system may be in the form of a blockchain network. The energy user may be a conventional user of electrical energy in an electrical energy system.

In accordance with one embodiment of the present invention, the network system is configured such that the energy user and a further apparatus in accordance with one of the preceding embodiments are included, wherein the transaction unit of the further apparatus is communicatively connected to the transaction unit of the energy producer for the purpose of arranging the transaction.

Small energy suppliers can therefore each have an apparatus for controlling a supplying and taking of electrical energy to and from their small energy producer network, said apparatuses each comprising a transaction unit, a logic unit and a measuring and control system. The small energy producers are then able to communicate each offer of energy or demand for energy to the energy trade prospect (or network), and an agreement can be concluded via the latter. The conclusion of the agreement can be reported back to both parties, whereupon the logic unit can trigger the transmission of the energy by actuating the control system via the logic unit. This allows flexible energy trade within the system between small energy producers.

It should be understood that features described, cited or provided individually or in any combination in connection with an apparatus for controlling a supplying and taking of electrical energy can, similarly, be applied individually or in any combination to a method for controlling a supplying and taking of electrical energy in accordance with embodiments of the present invention, and vice versa.

In accordance with one embodiment of the present invention, there is provision for a method for controlling a supplying and taking of electrical energy to and from a small producer network having at least one energy producer and at least one energy consumer, involving: communicating between the energy producer and the energy consumer (in particular within a network) in order to negotiate and/or define a transaction for a prescribed amount of energy; measuring an amount of supplied or taken energy; controlling a supplying or taking of the prescribed amount of energy via an electrical cable, in each case under the modulation of the logic unit.

Embodiments of the present invention will now be explained with reference to the accompanying drawings. The invention is not restricted to the embodiment illustrated.

DESCRIPTION OF THE INVENTION

Figure 1:
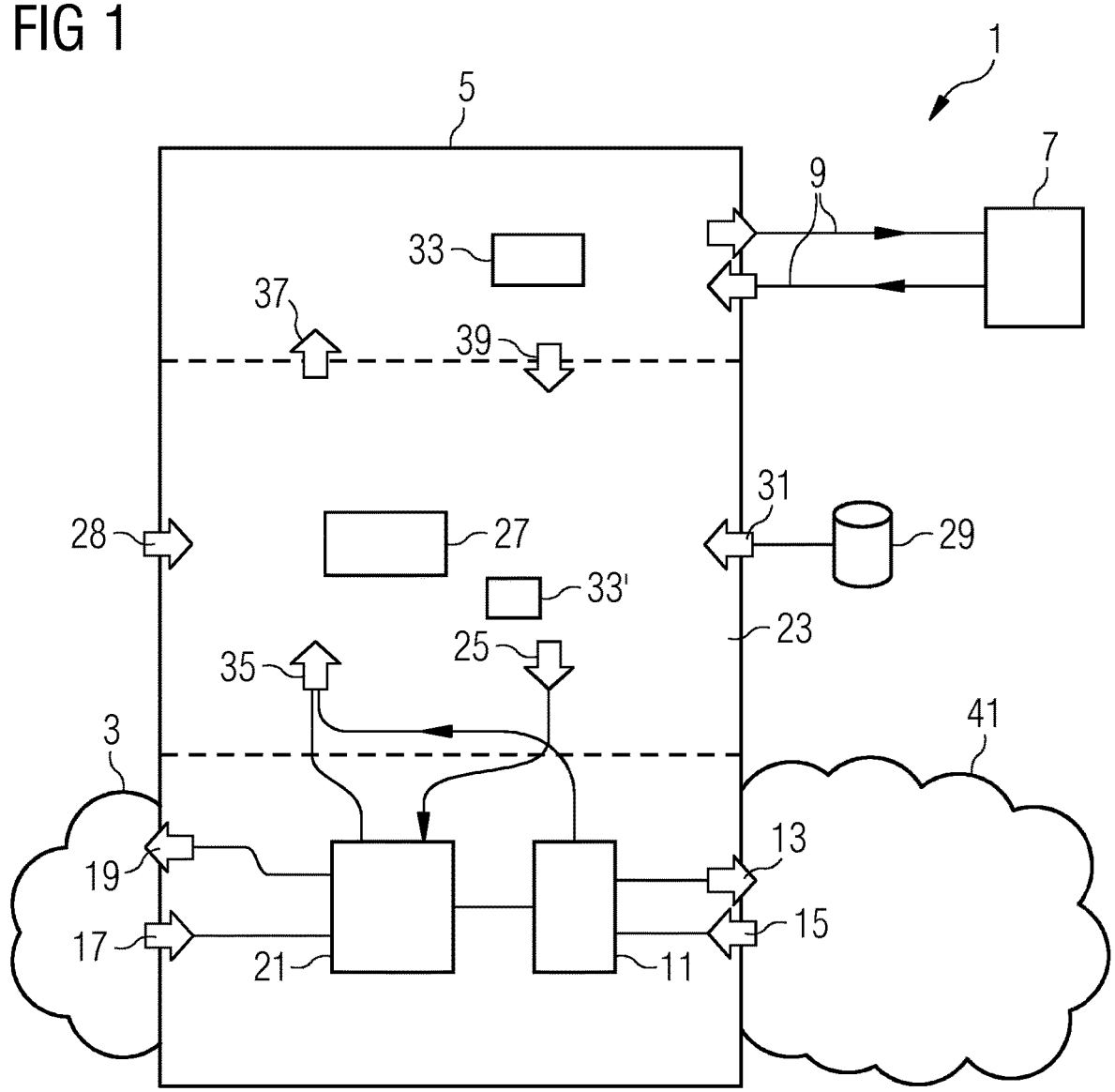
FIG. 1 schematically illustrates an apparatus for controlling a supplying and taking of electrical energy in accordance with an embodiment of the present invention.

The apparatus 1 schematically illustrated in FIG. 1 for controlling a supplying and taking of electrical energy to and from a small producer network 3 comprises a transaction unit 5 that is communicatively connected to at least one electronic energy trade prospect 7 or an entire network (such as network system 50 in FIG. 2) for the purpose of communication, in order to negotiate and/or define a transaction for a prescribed amount of energy. This is accomplished by virtue of the transaction unit 5 being connected to the electronic energy trade prospect 7, which itself may comprise an apparatus 1, via communication lines 9 that permit a bidirectional data interchange.

The apparatus 1 further comprises a measuring system 11 for measuring an amount of supplied or taken energy, the energy being taken via a connection 13 and supplied to the apparatus 1 via an electrical connection 15. Energy is taken (and transmitted to the apparatus 1) from the small producer network 3 via a connection 17 and supplied via the connection 19.

The apparatus 1 further comprises a control system 21 in communication with the measuring system 11, which is designed to supply the prescribed amount of energy to the small energy producer network 3, or to take it from the latter, via an electrical cable 17, 19.

In the embodiment illustrated in FIG. 1, the apparatus 1 further comprises a logic unit 23 in communication with the control system 21 and in communication with the transaction unit 5, in order to actuate the control system 21 on the basis of the transaction. The logic unit 23 is e.g. designed to communicate a control signal 25 for a flow of energy in concordance with the predetermined amount of energy to the control system 21.

The logic unit 23 is further equipped with a user interface 27, e.g. a keyboard with a screen, that allows a user to configure the apparatus 1. A data interface 28 can be used to supply further configuration data.

The logic unit 23 is further designed to retrieve and obtain parameters relevant to the control of the control unit 21 from a database 29, in particular via a data line 31.

In the illustrated embodiment 1, the transaction unit 5 also comprises a blockchain 33 in which a data record relating to the transaction is stored, said data record containing a hash value for a data record relating to a preceding transaction. The blockchain itself, that is to say the long data record, can therefore be managed in the transaction unit 5 separately from the logic unit 23. The separation is not absolutely necessary, but affords the advantage that the two "information tasks" closed-loop/open-loop control and management of the blockchain are separate and the computers do not influence one another in the present case.

The use of a blockchain is only one embodiment option in this case. It is likewise possible for the communication for trading the electrical energy to be managed centrally via a server.

In other embodiments, the blockchain 33 is arranged in other components of the apparatus 1, e.g. optionally as 33' in the logic unit 23, or outside the apparatus 1.

The measuring unit 11 uses a data line 35 to communicate the amount of supplied or taken energy to the logic unit 23.

The logic unit 23 is designed to use a data line 37 to transmit information about an energy demand or information about an available energy to the transaction unit 5. This can involve e.g. a supply period, a supply duration, a supplied amount, a location, a price and a type of production being transmitted to the transaction unit 5 via data lines 37. The transaction unit 5 then uses the communication lines 9 to communicate information relating to a supply or demand to the energy trade prospect 7, with which an agreement regarding the supply or purchase of electrical energy can then be concluded. The transaction unit 5 then receives confirmation about the transaction from the energy trade prospect 7 and transmits information regarding the concluded transaction to the logic unit 23 via a data line 39.

A central server for the energy trade is therefore not absolutely necessary; the trade can be handled by means of a local data interchange using blockchain.

In accordance with one embodiment of the present invention, the apparatus schematically depicted in FIG. 1 may be integrated in an electricity meter. The apparatus 1 is also referred to as a control unit below. The control unit can allow a private power trade. Agreements for the energy trade can be concluded (peer to peer) by means of transaction logic (contained in the transaction unit 5) via a data network, for example by means of blockchain. The logic unit 23 can be used to ascertain the individual demand for or supply of energy in this case and may be designed to ascertain the individual demand for and supply of energy. In particular, the logic unit may be designed to ascertain the demand for or supply of energy that a private end user or small producer has at a particular time. The measuring unit 11 can measure the actual flow of energy in this case; the demand/supply is ascertained and communicated by means of the transaction unit 5 and/or the logic unit 23. Coupled with further data sources, such as e.g. weather forecasts, number of hours of sunshine, etc., e.g. from source 29 via data line 31, and also criteria stored directly by the user (input e.g. via interface) for preferred power sources, the logic unit 23 can make an optimum prediction and control the trade accordingly. This can be accomplished by virtue of the control unit 21 serving as a "switch" that either uses the power produced itself for its own purposes as required or, if there are overcapacities, outputs it to the system 41, in particular the energy system 41.

The data line 35 can be used to communicate the amount of electrical energy for the consumers, the amount of electrical energy produced, the amount of electrical energy supplied and/or the amount of electrical energy taken. The data line 25 can be used to output control signals for the flows of energy to the switch.

The control line 37 can be used as required to transmit a search criterion for the selection of a suitable supplier (e.g. supply period, supply duration, supplied amount, location, price, type of production) and, on delivery, the report of the foreseeable supplied amount, period, duration, price. The data line 39 can be used as required to communicate a report regarding the conclusion of an agreement, in the event of success information regarding the supply period, supply duration, supplied amount, location, price, type of production and, on delivery, a report regarding the conclusion of an agreement, in the event of success with information regarding the supply period, supply duration, supplied amount, location, price. The system 50 may be connected to distribution system operators or transmission system operators, which are in turn contained in an energy network 55.

Figure 2:
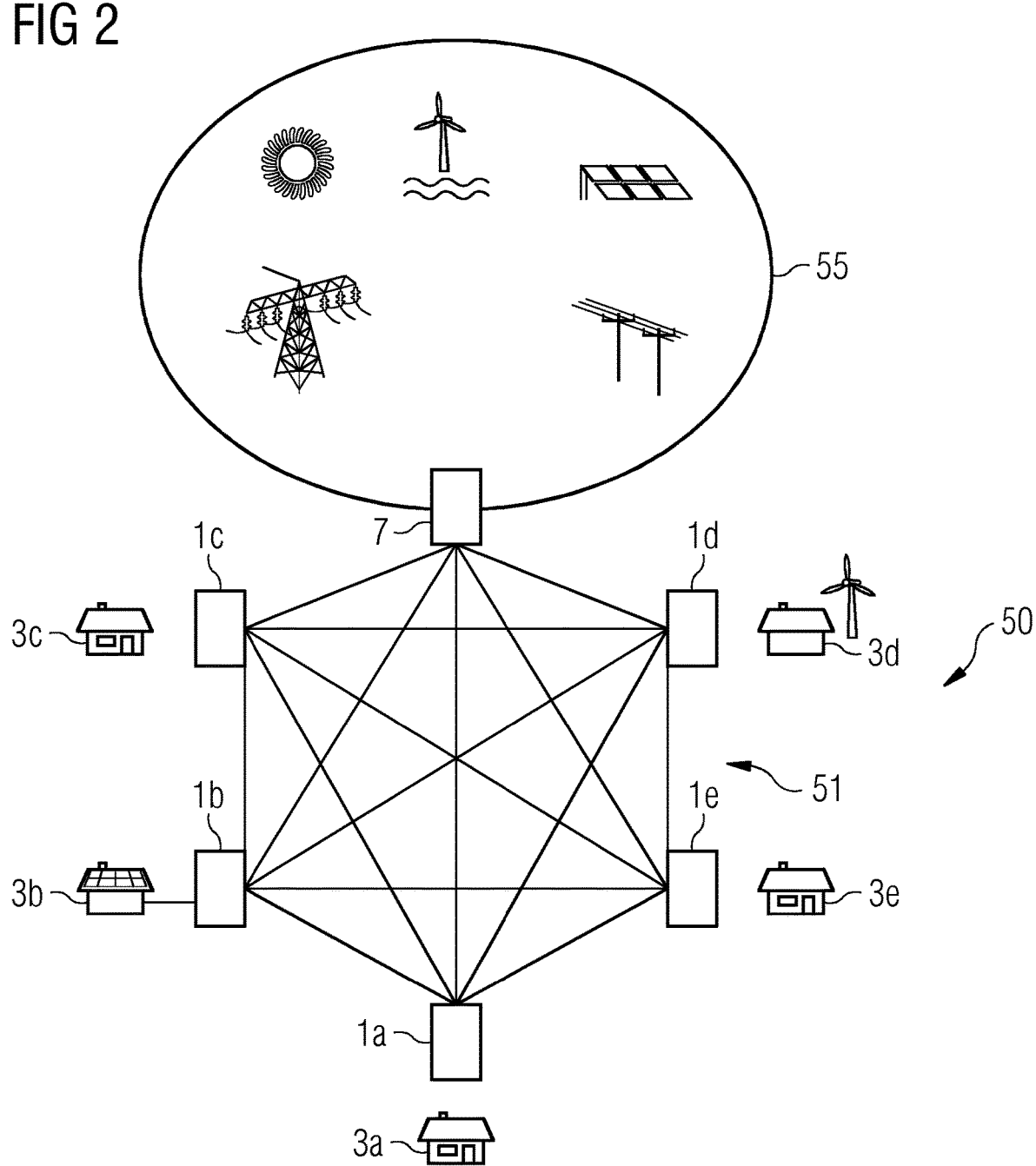
FIG. 2 schematically illustrates a system for transmitting energy in accordance with an embodiment of the present invention.

The available electrical energy can be fed to an existing system 41 (for example of a DSO) or directly to the consumer, as illustrated schematically in FIG. 2. In this regard, FIG. 2 schematically illustrates a system 50 for transmitting energy in accordance with an embodiment of the present invention. A plurality of small producer networks (and/or single persons) 3a, 3b . . . , 3e are communicatively connected in a communication network 51, in particular a trading network (blockchain) for private energy trade, specifically via respective control units 1a, 1b, . . . , 1e (as are illustrated e.g. in FIG. 1) that each have a transaction unit.

Not all of the users connected in the network 51 need to have an energy producer. The small producer network 1b has e.g. photovoltaic cells, which may be installed on a residential building, for example. The small producer network 1d has e.g. a wind turbine. 3a, 3c and 3e produce no electrical energy themselves and therefore feature only as customers/consumers.

The small producer networks 1a, . . . , 1e act in the present case as energy trade prospects 7 between which the energy trade takes place.

In the network 51, there is also provision for a further energy trade prospect 7 with which an energy trade between the various small producer networks or private networks 1a, 1b, 1c, . . . , 1e can take place. An energy flow between various users of the system 50 can take place through high-current cables, which are not illustrated. The electrical energy available in one of the small energy production networks can be fed to an existing network or directly to the consumer, as illustrated in FIG. 2. At the same time, the supplied amount of energy can be offered via a decentralized network as available and hence for purchase.

The network 55 comprises energy production, TSO infrastructure and DSO infrastructure.

Embodiments of the present invention can allow local trade of electrical energy. This can involve a private end user using a network interface to communicate its energy demand (and/or else the supply (e.g. "over supply in the case of 3b, . . . )). It can detect the optimum energy supply, according to its preferred criteria (e.g. as cheap as possible, green power, etc.), in the blockchain and use the blockchain to conclude the agreement.

The invention claimed is:

1. An apparatus for controlling a transfer of electrical energy to and from a small producer network having at least one energy producer and at least one energy consumer, the apparatus comprising:
   a transaction unit for communicating with at least one electronic energy trade prospect, said transaction unit being configured to negotiate and/or define a transaction for a prescribed amount of energy;
   a measuring system having at least one sensor for measuring an amount of energy that is supplied to, or taken from, the producer network;

a control system having a controller with a driver circuit in communication with said measuring system and configured to supply or take the prescribed amount of energy via an electrical cable;

a logic unit connected via a data line to said transaction unit and being configured for communication with said controller of said control system and with said transaction unit, said logic unit being configured to produce a forecast about energy required or available in the small producer network and transmitting the forecast to said transaction unit, the forecast defining the predetermined amount of energy and the forecast being based on additional information about specific time intervals or time periods at which an electric vehicle is typically charged and/or household machines are typically operated;

said transaction unit being configured, upon receiving confirmation about the transaction from the energy trade prospect, to transmit information regarding a concluded transaction to said logic unit via said data line; said logic unit being configured to actuate said control system based on the transaction and said control system being configured to supply or take the prescribed amount of energy based on the transaction for the prescribed amount of energy negotiated by said transaction unit.

2. The apparatus according to claim 1, wherein said logic unit is configured to communicate a control signal for a flow of energy in concordance with a predetermined amount of energy to said control system.

3. The apparatus according to claim 1, wherein said logic unit comprises a user interface configured to enable a user to configure the apparatus.

4. The apparatus according to claim 1, wherein said logic unit is configured to acquire parameters relevant to a control of said control unit from a database.

5. The apparatus according to claim 1, further comprising a blockchain storing a data record relating to the transaction, the data record containing a hash value for a data record relating to a preceding transaction.

6. The apparatus according to claim 1, wherein said logic unit is configured to communicate to said transaction unit at least one of the following items of information: a report of the expected amount of energy available for supply;
   a supply period;
   a supply duration;
   a supplied amount;
   a location;
   a price; and/or
   a type of production.

7. The apparatus according to claim 6, wherein the items of information are sent from said logic unit to said transaction unit if the energy is to be taken, in order to define an offer, in order to configure a search for and/or a selection of a transaction, or if the amount of energy is to be supplied.

8. The apparatus according to claim 6, wherein said transaction unit is configured to transmit information pertaining to a concluded transaction to said logic unit, wherein the information concerning when the amount of energy is to be supplied or to be taken comprises at least one of the following items of information:
   a confirmation of conclusion of an agreement;
   a supply period;
   a supply duration;
   a supplied amount;
   a location;
   a price; and/or
   a type of production.

9. The apparatus according to claim 1, wherein said measuring system is configured to communicate the amount of energy supplied or taken to said logic unit.

10. A network system for transferring electrical energy to and from a small producer network having at least one energy producer and at least one energy consumer, the network system comprising:
   at least one energy user having an electrical connection;
   an energy producer connected to said electrical connection of said energy user for transmitting electrical energy;
   a transaction unit communicatively connected to said at least one energy user, said transaction unit being configured to negotiate with the at least one energy user and/or define a transaction for a prescribed amount of energy;
   a measuring system having at least one sensor for measuring an amount of energy that is supplied to, or taken from, the producer network;
   a control system having a controller in communication with said measuring system and configured to control a transfer of electrical energy to and from a small producer network having the energy producer and the at least one energy consumer;
   a logic unit connected via a data line to said transaction unit and being configured to communicate with said control system and with said transaction unit, said logic unit being configured to produce a forecast about energy required or available in the small producer network and to transmit the forecast to said transaction unit, the forecast defining the predetermined amount of energy and the forecast being based on additional information about specific time intervals or time periods at which an electric vehicle is typically charged and/or household machines are typically operated;
   said transaction unit being configured, upon receiving confirmation about the transaction from the at least one energy user, to transmit information regarding a concluded transaction to said logic unit via said data line; and
   said logic unit being configured to actuate said control system based on the transaction, and said control system being configured to supply or take the prescribed amount of energy based on the transaction for the prescribed amount of energy negotiated by said transaction unit; and
   wherein the amount of energy arranged in the transaction is taken via the electrical cable and is supplied to the at least one energy user via said electrical cable.

11. A method for controlling a transfer of electrical energy to and from a small producer network, the producer network having at least one energy producer and at least one energy consumer, the method comprising:
   by a transaction unit communicating between the energy producer and the energy consumer and negotiating and/or defining a transaction for a prescribed amount of energy;
   by a logic unit producing a forecast about energy required or available in the small producer network, the forecast defining a predetermined amount of energy and the forecast being based on additional information about specific time intervals or time periods at which an electric vehicle is typically charged and/or at which a household machine is typically operated measuring, by a measuring system, an amount of energy being supplied to, or taken from, the producer network;

receiving, by the transaction unit, a confirmation about the transaction from the energy producer or the energy consumer, and transmitting information regarding a concluded transaction to the logic unit via a data line; and controlling, by a control system that is connected to the transaction unit and to the logic unit, a transfer of the prescribed amount of energy via an electrical cable based on the transaction for the prescribed amount of energy determined in the transaction.

12. The method according to claim 11, which comprises controlling the transfer of energy under a modulation of a logic unit in communication with the control system.

* * * * *